United States Patent [19]

Koskolos

[11] 4,009,895

[45] Mar. 1, 1977

[54] KNOCK-DOWN DUCT COLLAR

[75] Inventor: Nick J. Koskolos, Affton, Mo.

[73] Assignee: Intertherm, Inc., St. Louis, Mo.

[22] Filed: Aug. 21, 1975

[21] Appl. No.: 606,537

[52] U.S. Cl. .............................. 285/189; 285/158; 285/424

[51] Int. Cl.² ...................................... F16L 41/00

[58] Field of Search .......... 285/189, 424, 158, 421, 285/47

[56] References Cited

UNITED STATES PATENTS

| 540,827 | 6/1895 | Avery | 285/424 X |
|---|---|---|---|
| 1,982,498 | 11/1934 | Cornell | 285/424 X |
| 2,703,110 | 3/1955 | Curtis | 285/424 X |
| 2,963,783 | 12/1960 | Field | 285/424 X |
| 3,290,066 | 12/1966 | Primich et al. | 285/424 X |

Primary Examiner—Thomas F. Callaghan

[57] ABSTRACT

For use in connecting flexible air-carrying ducts into rectangular sub-floor ducts, a knock-down collar, easily installed in the field, possesses sufficient rigidity to withstand the compression of a draw band by which a flexible duct is secured. Field assembly is by means of a drive cleat over 180° flanges of the collar workpiece; tabs outstanding from the bends resist the hoop compression. A ring of inward-bent trapezoidal segments forms a flange presentable upwardly against the edge surface around an opening in a sub-floor duct with their tips bent upward and back to secure to such opening.

2 Claims, 6 Drawing Figures

KNOCK-DOWN DUCT COLLAR

BACKGROUND OF THE INVENTION

This invention relates to the construction and installation of collars by which a flexible duct, such as is used for conducting heated or cooled air, may be joined to a permanently installed rectangular duct, such as is used in the floors of mobile homes and the like.

It is frequently necessary to connect a furnace or air conditioner to such a permanently installed sub-floor duct system by means of relatively large diameter, flexible insulated ducts positioned beneath the mobile home. For this purpose a circular or elliptical opening may be cut in the planar lower surface of the duct and a collar installed therein. On the exterior surface of the collar, the flexible duct is secured by a flexible steel strap or draw band.

Heretofore collars have been used which are completely pre-fabricated, normally at a remote factory. Being generally cylindrical, the space and care required for storage and shipment is undesirably great.

Strapping an insulated duct tightly onto a downward projecting collar imposes substantial hoop compression on it. This adds to the difficulty of designing a knock-down collar which may be field assembled.

For a somewhat analogous use, namely connecting ducts to rectangular registers, knock-down connectors have employed bendable rectangular tabs to be inserted through a rectangular opening in a planar surface of the duct, as in U.S. Pat. No. 3,606,404.

SUMMARY OF THE INVENTION

The purposes of the present invention include providing a knock-down duct collar which is simple to manufacture, compact to ship, and easy to assemble at the site of installation. A further purpose is to provide such a knock-down collar with sufficient strength that when assembled it can withstand not only internal pressures, but also the hoop compressive forces which are applied to its exterior by the strapping on a flexible duct. A still further purpose is to provide easy, form-fitting attachment within a planar opening which may be either circular or oval or elliptical. Still further purposes will appear from the remainder of this specification.

Generally summarizing (without limiting the disclosure or claims which follow), I provide a sheet metal body which is readily bent to rounded form and which has, at each of its side edges, margins bent inward and back at 180°, to be assembled by a drive cleat. To prevent the abutting edges from riding over each other when hoop compressive forces are applied, I provide at the 180° bend lines arcuate cut-outs, which, when the remainder of the margins are bent, are left unbent to provide tabs projecting endwise from the 180° bends at their outer surfaces. On rounding the workpiece and bringing the 180° bent edges into abutment, each of the tabs abuts against the outer surface of the opposite edge. Hence, when tension is applied to a draw band about a duct fitted onto the collar, the tabs will hold the 180° bent edges in place so that they cannot ride over each other.

When the rectangular sheet metal workpiece is so bent into a collar, one of its longer edges will serve as a duct entrant edge; the other is so fabricated as to permit easy attachment to a planar opening in the permanently installed duct system. Two parallel 90° bends are to be made spaced inward of this edge, the outer being bent in the direction opposite to that of the inner. Prior to bending, a large number (for example 30 or more) cut-outs are made extending inward from this edge through these two marginal portions, the cut-outs narrowing to vertices at the inner bend line, thus providing segments which, between the two bend lines, are trapezoidal. If the angle of each vertex is say 12°, 30 such cut-outs will provide 360° of angular space to present these trapezoidal segments inwardly in what is effectively a planar flange. Such flange is presentable against the under surface of a rounded duct opening, with the bent segments of the outer marginal portion extending therethrough. The worker installing the collar may reach through the ring formed by these latter segments to bend them back onto the inside surface of the duct, thereby holding the collar firmly in place.

DESCRIPTION OF THE PREFERRED EMBODIMENT

Figure 1:
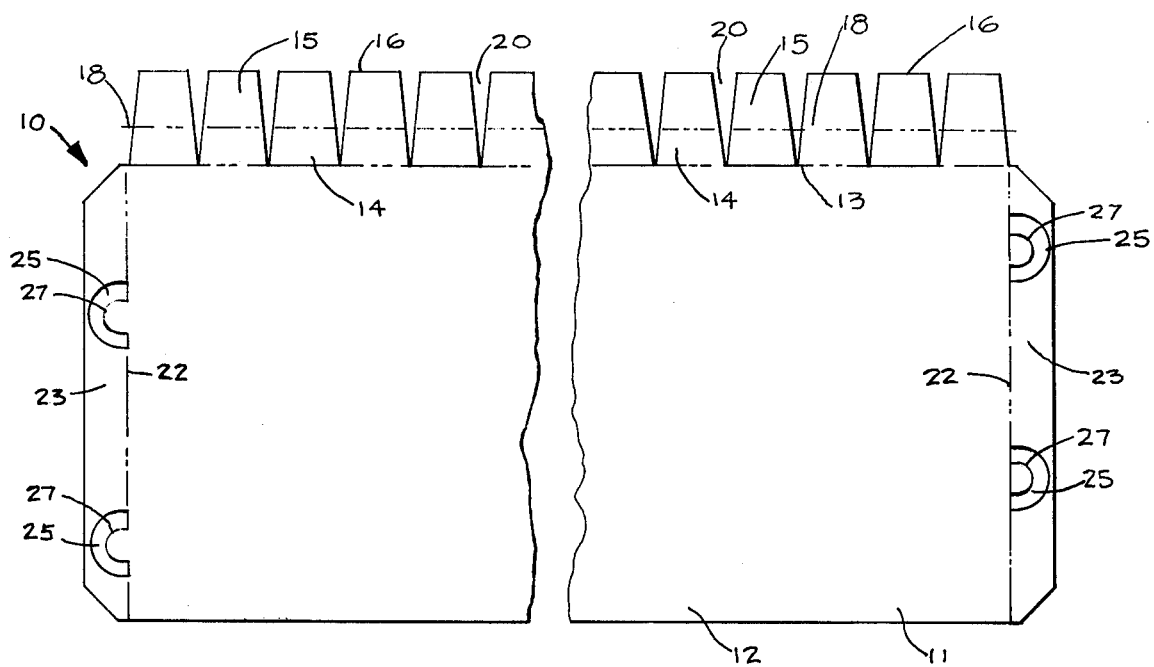
FIG. 1 is a view in flat pattern, partly broken away, of a sheet metal workpiece blank from which the present duct collar is formed.

A knock-down duct collar embodying the present invention is formed from bendable sheet metal, such as galvanized steel. The workpiece generally designated 10, shown in flat pattern in FIG. 1, is a somewhat elongated strip, including an essentially rectangular collar body wall portion 11, one of whose longer edges 12 will serve as a duct entrant edge. The opposite body wall edge is a bend line 13, outstanding from which are two portions designated as the inner marginal portion 14 and the outer marginal portion 15. The latter terminates in an extreme edge 16 which is parallel to the body wall edge line 13. Spaced between them is an intermediate parallel bend line 18, which divides the marginal portions 14, 15 from each other.

Extending inward from the extreme edge 16 through the intermediate bend line 16 into the body wall edge bend 13 are a series of V-shaped cut-outs 20, which narrow to vertices at the bend line 13. The total of the angles of these vertices is at least 360° and preferably somewhat greater. Thus 32 such cut-outs, each having a vertex angle of 12°, will provide a total of 384°. As is seen from FIG. 1, the cut-outs 20 divide both the outer marginal portion 15 and the inner marginal portion 14 into trapezoidal segments, the longer edges of the inner marginal portions segments 14 being contiguous with each other along the bend line 13.

The shorter edges 22 of the collar body wall portion 11 are the bend lines, hereinafter described, from which marginal portions 23 extend outward. For ease of assembly, the corners of the marginal portions 23 are cut off.

Each of the marginal portions 23 has preferably two arcuate cut-outs 25, which extend from the body edge bend line 22 into the margin and thence back to the bend line. Considering their spacing from the entrant edge 12, the cut-outs 25 at the left margin are offset from, and hence out of registration with, the corresponding cut-outs at the opposite edge. The portions within the arcuate cut-outs 25 which project outward from the body edge bend lines 22 are referred to as tabs 27.

Figure 2:
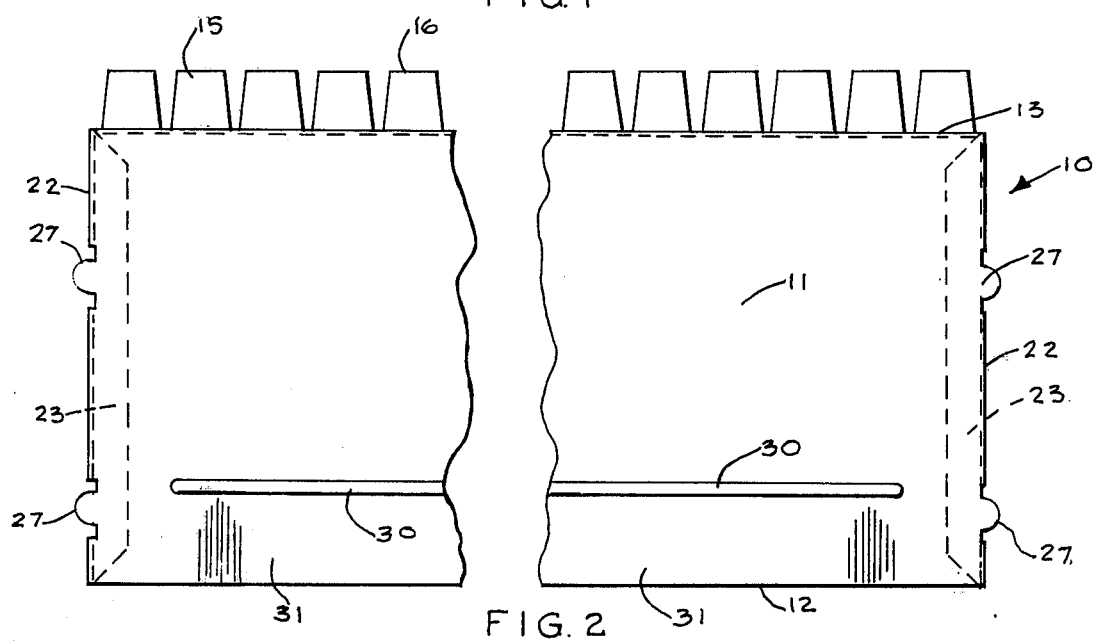
FIG. 2 is a view corresponding to FIG. 1 showing the workpiece blank bent and formed, prior to assembly. For clarity, this view shows the workpiece as flat, without the curvature which results from crimping the lower edge.

Referring now to FIG. 2, which shows how the flat pattern is bent, the margins 23 are bent back and inward at 180°, leaving the tabs 27 projecting. The longer body wall edge bend line 13 is bent back in an inward 90° bend, best seen in the assembly view, FIG. 6; while the intermediate bend line 18 is bent 90° in the opposite direction. By these bends at lines 13 and 18, the outer marginal segments 15 present an upward continuation of the collar body wall 11, spaced inwardly therefrom in an amount equal to the distance between the body wall edge bend line 13 and the intermediate bend line 18.

Figure 3:
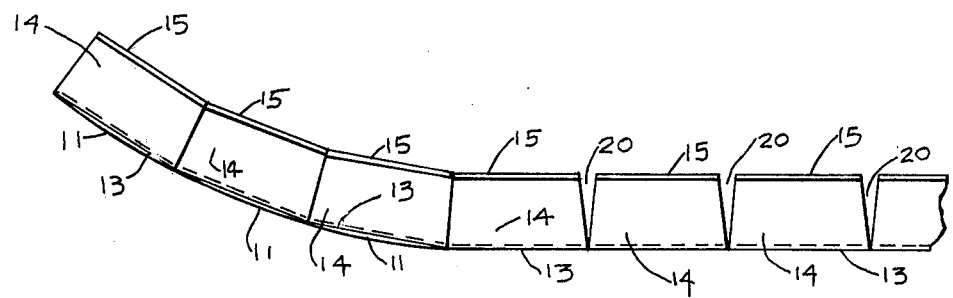
FIG. 3 is a fragmentary view from above, partly enlarged, showing the trapezoidal segments of the inner margin. At the right side the segments are shown standing apart, before the collar is rounded; at the left side same are shown after the collar is rounded.

This inward spacing is best illustrated in FIG. 3, which is a partial view from above. At its right side, the body wall 11 is shown unbent. At the left side, the collar body wall 11 is rounded in a smooth curve, which is substantially followed by the longer edges of the trapezoidal segments 14 of the inner marginal portion. By this rounding, the V-shaped cut-outs 20 (or at least 360° thereof) are in effect closed, and the upstanding outer marginal portions 14 form a segmented, nearly circular flange which extends inward in a plane perpendicular to the centerline about which the collar is rounded.

Figure 6:
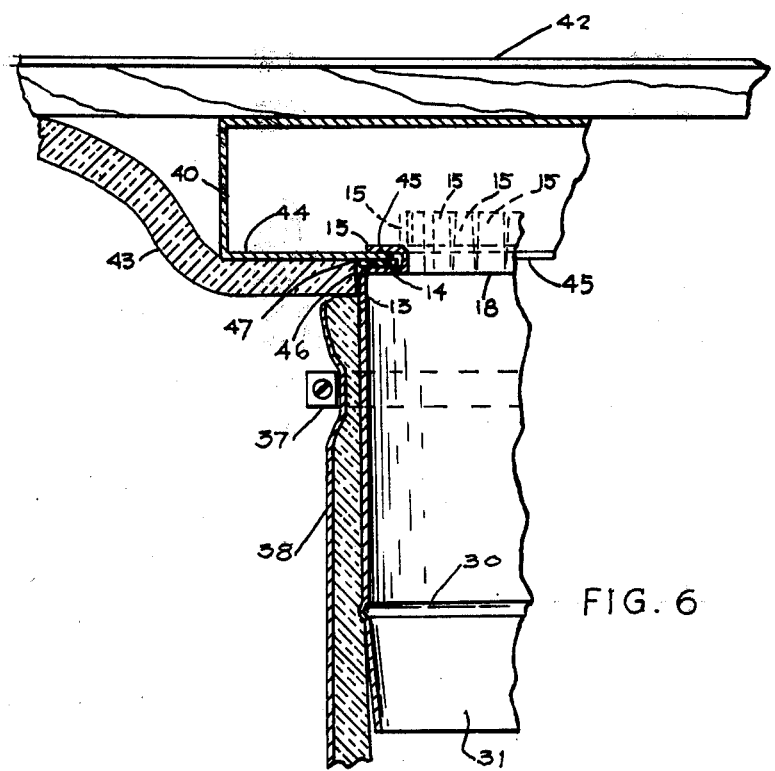
FIG. 6 is an installation drawing showing the completed collar installed in the under surface of a sub-floor duct, and with an insulated flexible duct strapped to its outer surface. The dashed lines shown the outer marginal segments prior to bending.

An outward-extending bead generally designated 30 is formed in the body wall portion 11 somewhat closer to the entrant edge 12 than to the opposite edge bend line 13. The bead 30 stops short of the 180° bend lines 22. The portion between the entrant edge 12 and the bead 30 is slightly crimped to serve as entrant edge portion 31 which tapers slightly inwardly as shown in FIG. 6. Forming the bead 30 and the crimped margin 31 imparts to the workpiece 10 some curvature, not shown in FIG. 2. Nevertheless, workpieces so fabricated are nestable and stackable; and hence they are readily handled in storage and shipment, occupying far less space than would conventional cylindrical collars.

Figure 5:
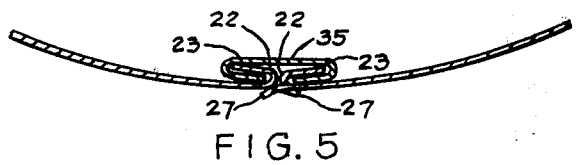
FIG. 5-5 is an enlarged fragmentary cross-section seen along line 5—5 of FIG. 4.

For assembly in the field, a conventional C-shaped drive cleat 35, shown in cross-section in FIG. 5, is used to secure the opposite 180° bent edges 22 together. As illustrated, the size of the C-cleat is such as to fit snugly over the bent back margins 23. Use of such a drive cleat or C-cleat 35 to join the edges of a sheet metal member into a cylindrical body will effectively resist hoop tension, such as is applied by positive pressures within such a body.

In the present case, however, the duct collar must withstand the much greater hoop compression, applied on installation by tightening an external steel strap fitting 37 about a flexible insulated duct 38, as will be described in connection with FIG. 6. If only the C-cleat 35 were used, such externally applied hoop compression would press the 180° bend back edges 22 against each other. Such pressure would tend to cause the edges 22 to ride over each other and work themselves out of the C-cleat 35.

Figure 4:
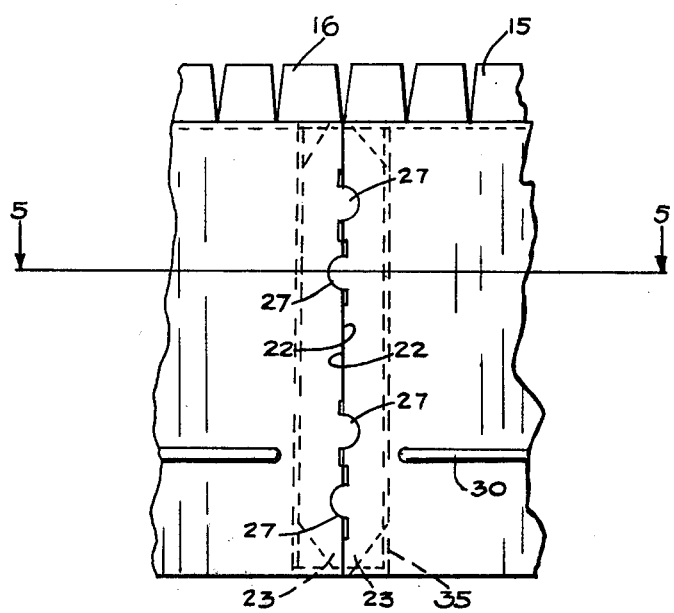
FIG. 4 is a fragmentary view of the outer seam of the collar, as joined.

The purpose of the tabs 27 is to prevent this. As seen in FIGS. 4 and 5, when the C-cleat 35 is applied to drive the edges 22 together, the tabs 27 along one of the edges 22 are flexed outward; they press against the outer surface of the other 180° bend 22. Each pair of staggered tabs 27 prevents each of the edges 22 from "riding over" the other, holding them in place to withstand hoop compression.

FIG. 6 shows schematically a typical installation of the present knockdown duct collar in the permanent duct system of a mobile home. A rectangular duct generally designated 40 is installed beneath the joists 41 of a mobile home floor 42 and conventional flexible insulting sub-floor blanket 43, whose lower surface is impervious to water, is drawn taut beneath it. Using the flexible construction so described, it is not feasible to secure any connecting collar to such sub-floor insulating material; the securement must be to the duct itself, preferably without loss of the insulation barrier.

The duct 40 has a planar lower wall 44 in which a circular opening 45 is cut to a diameter slightly in excess of that formed by the upward extending circle of marginal portions 14, 15. A circular opening 46 is cut in the subfloor blanket 43, to a diameter just sufficient to permit entry of the outer diameter of the collar as assembled.

On the inward flange formed by the inner marginal portions 14 is laid a sealing washer 47. The collar is then raised so that these portions 14 with sealing washer 47 are presented against the under surface of the edge of the duct opening 45, and the upstanding outer marginal segments 15 extend through it and above the duct planar surface 44, as shown by the dashed lines in FIG. 6. Working through the collar, the installer bends the marginal portions 15 downward and backward as shown in solid lines, to grip the margin of the opening 45 in a 180° bend sealed by the washer 47.

With the collar so installed, the end of an insulted flexible duct 38 may be drawn over the crimped entrant portion 31 and bead 30, and brought close to the subfloor blanket opening 46. A conventional tension strap 37 with a tightenable fitting is brought about the outer side of the duct and drawn tight. While it imposes substantial hoop tension on the knock-down collar, its joint shown in FIGS. 4 and 5 holds firmly.

Only thirty 12° cut-outs would be necessary if precisely spaced and if the opening 45 in which the collar is installed was precisely circular. This may not be feasible; hence more than 360° of cut-outs are provided. To provide for elliptical or oval openings, the segments of two opposite portions may be cut to greater angles, or cut-outs may be provided at shorter intervals. The V-shape of the cut-outs 20 is significant only for the inner trapezoidal marginal segments 14; between the outer segments 15 the lines of cut-out may be parallel, leaving the segments 15 rectangular. These and other modifications in the design and installation of knock-down collars will, from this specification, be apparent to persons having ordinary skill in the art.

I claim:

1. A knock-down duct connector collar adapted for easy assembly within a rounded opening in a duct planar surface, comprising a generally rectangular sheet metal workpiece having two opposite side edges, each of said side edges being bent back at 180° from which margins extend, each of said margins having a first cut-out to provide a tab projecting endwise, one of its end edges being a duct-entrant edge, said workpiece being characterized in having along its outer end edge an outer marginal portion extending to a closer parallel bend line, and an inner marginal portion extending therefrom to a farther inward parallel bend line, and bent in the opposite direction, together with a plurality of second cut-outs extending from said end edge through both said marginal portions and narrowing to vertices at said farther bend line, thereby dividing both said marginal portions into segments, those segments between the two bend lines being trapezoidal, the total of the angles of their said vertices being at least 360°, whereby on rounding the workpiece to form a collar with said bent-back margins on the inner side and bringing said edges into abutment and on joining said margins with a drive cleat, the tab on each said edge abuts the outer surface of the bent-back edge so brought into abutment with it thereby preventing the 180° bent edges from riding over each other when hoop compressive forces are applied, the said trapezoidal segments between said inner and outer bands form in effect a transverse planar inward flange which may be presented against the margin of such rounded duct surface opening, and the segments of the outer marginal portion form a nearly circular projecting flange of lesser diameter to be inserted through such rounded opening for bending back on the inside thereof.

2. A knock-down duct collar as defined in claim 1, wherein the number of said second cut-outs is substantially thirty and the vertex angle of each is substantially 12°.

* * * * *